United States Patent
Nakane et al.

[15] 3,652,945
[45] Mar. 28, 1972

[54] CIRCUITS FOR CONVERTING THE EFFECTIVE VALUE OF INPUT ELECTRIC SIGNALS INTO DC VOLTAGES

[72] Inventors: Hisao Nakane; Akihisa Hashimoto, both of Tokyo, Japan

[73] Assignee: Yokogawa Electric Works, Limited, Tokyo, Japan

[22] Filed: Feb. 4, 1971

[21] Appl. No.: 112,665

[30] Foreign Application Priority Data

May 12, 1970 Japan..................................45/40309

[52] U.S. Cl..............................328/150, 307/261, 328/26, 328/127, 328/144, 328/160
[51] Int. Cl.........................................G06g 7/18, H03k 5/00
[58] Field of Search....................328/26, 144, 150, 159, 160, 328/127; 324/132; 307/260, 261

[56] References Cited

UNITED STATES PATENTS 2,822,474  2/1958  Boecker...................................328/26

*Primary Examiner*—John Zazworsky
*Attorney*—Chittick, Pfund, Birch, Samuels & Gauthier

[57] ABSTRACT

A circuit for converting the effective value of an input electric signal into a DC voltage comprises an integrator for producing a DC output voltage, a first means for adding the input signal to a signal fed back from the output side of the integrator, a second means for subtracting the signal fed back from the output of the integrator from the input signal, and means for multiplying the output from the first means with the output from the second means for applying the product to the input of the integrator.

8 Claims, 3 Drawing Figures

INVENTORS
HISAO NAKANE
AKIHISA HASHIMOTO

BY Chittick, Pfund, Birch,
Samuels & Gauthier
ATTORNEYS

CIRCUITS FOR CONVERTING THE EFFECTIVE VALUE OF INPUT ELECTRIC SIGNALS INTO DC VOLTAGES

BACKGROUND OF THE INVENTION

This invention relates to a circuit for converting the effective value of an input electric quantity into a DC voltage.

In one example of the prior circuits for converting the effective value of an input electric quantity into a DC voltage, the input electric quantity is first squared and then the square root of the mean value is extracted, whereas in another example, the input electric quantity is passed through a heating wire and the quantity of the heat generated is measured by a thermocouple. However, it is troublesome to square the input signal and then to extract the square root of the mean value. Further, since the circuit utilizing the heating wire is not rigid, the accuracy of the measurement is affected by the overload or aging. Moreover, the response of the circuit is sluggish and the accuracy of the operation of the circuit is not high.

SUMMARY OF THE INVENTION

It is an object of this invention to provide a novel circuit for converting the effective value of an electric quantity into a DC voltage which is simple in construction.

Another object of this invention is to provide an improved circuit for converting the effective value of an electric quantity into a DC voltage having a high response speed and a high accuracy.

According to this invention these and further objects can be accomplished by providing a circuit for converting the effective value of an input electric signal into a DC voltage comprising an integrator for producing a DC output voltage, a first means for adding the input signal to a signal fed back from the output side of the integrator, a second means for subtracting the signal fed back from the output of the integrator from the input signal, and means for multiplying the output from the first means with the output from the second means for applying the product to the input of the integrator.

The integrator has a time constant enough to sufficiently attenuate the AC component contained in the input signal. In the signal transmission circuit from the multiplier to the integrator is inserted a variable gain circuit manifesting a large gain while the input signal is smaller than a predetermined value, whereas a small gain when the input signal exceeds the predetermined value.

DESCRIPTION OF THE PREFERRED EMBODIMENTS

Figure 1:
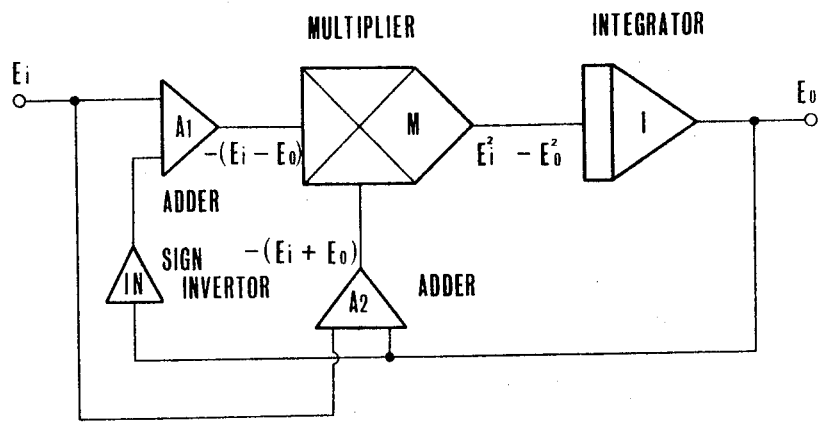
FIG. 1 shows a block diagram of the basic form of the circuit of this invention and FIGS. 2 and 3 show block diagrams of preferred embodiments of this invention.

The circuit shown in FIG. 1 comprises a multiplier M which produces an output corresponding to the product of two inputs, an integrator I having a time constant CR selected to sufficiently attenuate the AC component contained in the input signals, adders $A_1$ and $A_2$ and a sign inversion circuit IN. $E_i$ represents an input voltage and $E_0$ an output voltage. The sum of the input voltage $E_i$ and output voltage with its sign inverted, $-E_0$, is applied to multiplier M as one of its inputs through one adder $A_1$ whereas the sum of the input voltage $E_i$ and the output voltage $E_0$ is applied to the other input of the multiplier through the other adder $A_2$. The output from multiplier M is integrated by integrator I to produce the output voltage $E_0$.

The circuit shown in FIG. 1 operates as follows.

Since the output voltage $(E_i^2 - E_0^2)$ from the multiplier M is applied to integrater I, the output voltage $E_0$ from the integrator I is given by an equation $$E_0 = -1/CR \int (E_i^2 - E_0^2) \, dt \qquad (1)$$

Thus, the integrator I integrates the difference between the squares of input voltage $E_i$ and the output voltage $E_0$. As above described, as the time constant of the integrator I is sufficiently large to attenuate AC components, the output voltage $E_0$ corresponds to the integrated value of the DC component of the difference $(E_i^2 - E_0^2)$. Consequently, the output voltage $E_0$ varies so long as the DC components of $E_i^2$ and $E_0^2$ are different, and stops to vary when the difference between DC components becomes zero.

Representing the input voltage $E_i$ by the Fourier series:

$$E_i = E + \pi E_n \sin(nwt + \theta) \qquad 2.$$

then $$E_i^2 = E^2 + \sum_n \frac{E^2 n}{2}$$

$$- \sum_n \frac{E^2 n}{2} \cos 2(n\omega t + \theta n)$$

$$+ 2 E E_n \sin(n\omega t + \theta n)$$

$$+ 2 \sum_{h \neq k} E_h E_k \sin(h\omega t + \theta_h) \sin(k\omega t + \theta_k) \qquad (3)$$

In this equation, the two terms on line 1 represent the DC components whereas the second and following lines the AC components. Accordingly, the difference between the squares of the output voltage $E_i$ and the output voltage $E_0$ is given by the following equation:

$$E_i^2 - E_0^2 = E^2 + \sum_n \frac{E^2 n}{2} - E_0^2$$

$$- \sum_n \frac{E^2 n}{2} \cos 2(n\omega t + \theta_n)$$

$$+ 2 \sum_n E E_n \sin(n\omega t + \theta n)$$

$$+ 2 \sum_{h \neq k} E_h E_k \sin(h\omega t + \theta h)$$

$$\sin(k\omega t + \theta k) \qquad (4)$$

Since the AC components represented by the second and following lines are not included in the integrated value, the output voltage $E_0$ of the integrator I reaches a definite value at a condition of $$E^2 + \sum_n \frac{E^2 n}{2} - E_0^2 = 0 \qquad (5)$$

Hence the output voltage $E_0$ under this condition is given by $$E_0 = \pm \sqrt{E^2 + \sum_n \frac{E^2 n}{2}} \qquad (6)$$

The right hand term of equation 6 is expressed by the square roots of the sum of the squares of the effective values of respective components of the input voltage $E_i$, which means that this term represents the effective value of the input voltage $E_i$. Thus, the output voltage $E_0$ of integrator I as it reaches the definite value represents the effective value of the input voltage.

Figure 2:
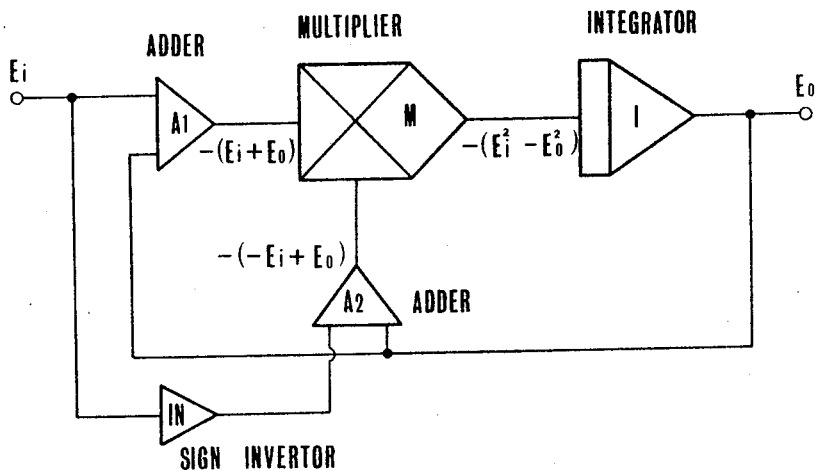

FIG. 2 shows a block diagram of another embodiment of this invention, which is generally identical to that shown in FIG. 1 except that the sign of the input voltage $E_i$, rather than the output voltage, is revised for providing a difference $E_i - E_0$. In the circuit shown in FIG. 2, too, when the difference between DC components of the input to integrator I becomes zero, that is when $E_i^2 - E_0^2 = 0$, the output voltage $E_0$ of the integrator I represents the effective value of the input voltage $E_i$.

When compared with the prior circuit wherein the input voltage is squared and then the square root of the mean value is extracted, the novel circuit is more simple in construction and when compared with the prior circuit utilizing the thermocouple the novel circuit has higher accuracies and response and is sturdy.

Considering the polarity of the feedback signal to the integrator in the basic circuit shown in FIG. 1, the positive value $$+\sqrt{E^2 + \sum_n \frac{E^2 n}{2}}$$

of the right hand term of equation 6 is unstable. Because, when integrator I produces a positive output voltage $E_0$ and when a condition $E_i^2 - E_0^2$ holds true on the input side of integrator I, then if the input voltage $E_i$ varies from this condition in such direction that its absolute value decreases, a relation $E_i^2 - E_0^2 < 0$ will be established on the input side of integrator I. Since, under this condition, the positive output voltage of the integrator I tends to increase the value $(E_i^2 - E_0^2)$ becomes a larger negative value on the input side of the integrator I whereby the output voltage $E_0$ of the integrator I increases further until a positive saturation is reached. Whereas the negative value $$-\sqrt{E^2 + \sum_n \frac{E^2 n}{2}}$$

in the right-hand term of equation 6 is a stable value not accompanying this phenomenon. Accordingly, it is suffice to obtain the stable negative value as the final output signal and the unstable positive value is not necessary.

The speed of the integrator I at which the integrator reached an equilibrium point is expressed by the rate of change of the output voltage $E_0$, viz., $$\frac{dE_0}{dt} = -\frac{1}{CR}(E_i^2 - E_0^2)$$
$$= K(E_0^2 - E_i^2) \qquad (7)$$

where K represents a constant.

Assuming that the integrator I is now on the way to the equilibrium and the output voltage $E_0$ is different by $\Delta E$ from input voltage $E_i$. Since the output voltage $E_0$ is expressed by $$E_0 = E_i + \Delta E$$

By substituting this relation into equation 7, we obtain the following equation representing the rate of change of the output voltage $E_0$ $$\frac{dE_0}{dt} = K(E_i^2 + 2\Delta E E_i + \Delta E^2 - E_i^2)$$
$$K(2\Delta E E_i + \Delta E^2)$$

This means that the rate of change of the output voltage $E_0$ varies dependent upon the magnitude of the input voltage $E_i$. The rate of change of the output voltage $E_0$ decreases with the decrease in the input voltage $E_i$ and becomes a minimum when the input voltage becomes zero provided that the differential $\Delta E$ remains constant. For this reason, the speed at which the integrator I approaches the equilibrium point that is the speed of obtaining the solution becomes slower as the input voltage approaches zero so that in order to obtain sufficiently high speed of solution it is necessary to sufficiently increase the gain of the integrator. However, when the gain of the integrator were increased to a high value, the integrator I would become saturated when the input voltage becomes high.

Figure 3:
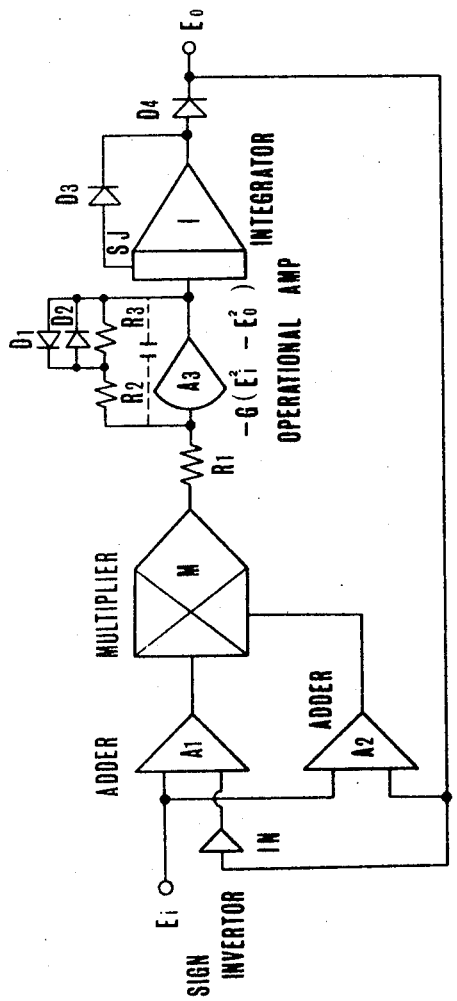

A modified embodiment shown in FIG. 3 includes a device for obviating this difficulty. In addition to the circuit components shown in FIG. 1 there are provided an operational amplifier $A_3$, an input resistor $R_1$ for amplifier $A_3$, serieally connected feedback resistor $R_2$ and $R_3$, and diodes $D_1$ and $D_2$ connected in parallel position. These diodes are connected in parallel with resistor $R_3$ to impart a polygonal line function characteristic to the feedback resistors. Thus, the gain of the operational amplifier circuit is high so long as the input voltage thereto is low and hence the voltage impressed across feedback resistors $R_2$ and $R_3$ is low so that diodes $D_1$ and $D_2$ are nonconductive, whereas the gain becomes low when the input voltage is increased to increase the voltage impressed upon feedback resistors $R_2$ and $R_3$ thus rendering conductive diodes $D_1$ and $D_2$. A diode $D_3$ is connected between the output terminal of integrator I and the summing junction for clamping to a small value the negative polarity output of the integrator so as to prevent integrator I from saturating in the negative direction. Furthermore, a diode $D_4$ is connected on the output side of integrator I to prevent the negative polarity output of the integrator from being fed back thus preventing the output from being unfixed. In the embodiment shown in FIG. 3, since the operational amplifier $A_3$ is connected between multiplier M and integrator I, the polarity of the input voltage to integrator I becomes opposite to that of the circuit shown in FIG. 1 with the result that the polarity of the output that causes the undesirable alternation of the output is also opposite to that of the circuit shown in FIG. 1. Thus, in this case, the negative polarity output voltage functions to prevent the output from being unfixed.

The circuit shown in FIG. 3 operated as follows.

The output of multiplier M is amplified by the operational amplifier by a factor of its gain and is then applied to integrator I. For this reason, even the value of the input voltage $E_i$ is near zero, the speed of the operation of the integrator I is sufficiently high. As the input voltage $E_i$ increases to increase the output voltage of multiplier M beyond a predetermined value, the gain of the operational amplifier is reduced by the polygonal line characteristic of the feedback resistors to decrease the rate of increase in the voltage applied to integrator I thereby preventing saturation thereof. Due to the function of diodes $D_3$ and $D_4$, the output voltage $E_0$ of only the positive polarity is produced from integrator I, thus removing unstability. For this reason, the circuit shown in FIG. 3 operates stably at a high speed.

When the frequency of the input voltage $E_i$ is low and the time constant alone is not enough to sufficiently attenuate the AC components, a capacitor may be added to the feedback circuit of the operational amplifier $A_3$ to impart a suitable first-order-lag characteristic.

While the invention has been shown and described in terms of some preferred embodiments many changes and modifications will occur to those skilled in the art within the true spirit and scope of the invention as defined in the appended claims.

What is claimed is:

1. A circuit for converting the effective value of an input electric signal into a DC voltage, comprising an integrator for producing a DC output voltage, a first means for adding said input signal to a signal fed back from the output side of said integrator, a second means for subtracting said signal fed back from the output of said integrator from said input signal, and means for multiplying the output from said first means with the output from said second means for applying the product to the input of said integrator.

2. The circuit as defined in claim 1 wherein said integrator has a characteristic to sufficiently attenuate the AC component contained in the input to said integrator.

3. The circuit as defined in claim 1 wherein said integrator includes means for preventing the flow of an output signal of a predetermined polarity.

4. The circuit as defined in claim 1 wherein said integrator further comprises means for clamping the output signal of said predetermined polarity to a sufficiently small value.

5. The circuit as defined in claim 1 wherein a variable gain circuit is inserted in the signal transmission circuit from said multiplier means to said integrator, said variable gain circuit manifesting a large gain while said input signal is smaller than a predetermined value whereas a small gain when said input signal exceeds said predetermined value.

6. The circuit as defined in claim 2 wherein a variable gain circuit is inserted in the signal transmission circuit from said multiplier means to said integrator, said variable gain circuit manifesting a large gain while said input signal is smaller than a predetermined value whereas a small gain when said input signal exceeds said predetermined value.

7. The circuit as defined in claim 3 wherein a variable gain circuit is inserted in the signal transmission circuit from said multiplier means to said integrator, said variable gain circuit manifesting a large gain while said input signal is smaller than a predetermined value whereas a small gain when said input signal exceeds said predetermined value.

8. The circuit as defined in claim 4 wherein a variable gain circuit is inserted in the signal transmission circuit from said multiplier means to said integrator, said variable gain circuit manifesting a large gain while said input signal is smaller than a predetermined value whereas a small gain when said input signal exceeds predetermined value.

* * * * *

UNITED STATES PATENT OFFICE
CERTIFICATE OF CORRECTION

PO-1050
(5/69)

Patent No. 3,652,945    Dated  March 28, 1972

Inventor(s) Hisao Nakane and Akihisa Hashimoto

It is certified that error appears in the above-identified patent and that said Letters Patent are hereby corrected as shown below:

Column 2, line 13, the equation "$E_i = E + \pi E_n \sin(nwt+\theta)$"

should read -- $E_i = E + \sum_n E_n \sin(nwt+\theta_n)$ --

Column 6, line 12, before the word "predetermined" insert the word -- said --.

Signed and sealed this 25th day of July 1972.

(SEAL)
Attest:

EDWARD M. FLETCHER, JR.        ROBERT GOTTSCHALK
Attesting Officer              Commissioner of Patents